(12) United States Patent
Okabe et al.

(10) Patent No.: US 9,733,979 B2
(45) Date of Patent: Aug. 15, 2017

(54) COMMUNICATION DEVICE

(71) Applicant: YOKOGAWA ELECTRIC CORPORATION, Musashino-shi, Tokyo (JP)

(72) Inventors: Nobuo Okabe, Tokyo (JP); Yukiyo Akisada, Tokyo (JP); Kazunori Miyazawa, Tokyo (JP); Yasuki Sakurai, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 0 days.

(21) Appl. No.: 14/395,600

(22) PCT Filed: May 24, 2013

(86) PCT No.: PCT/JP2013/064472
§ 371 (c)(1),
(2) Date: Oct. 20, 2014

(87) PCT Pub. No.: WO2013/176250
PCT Pub. Date: Nov. 28, 2013

(65) Prior Publication Data
US 2015/0089508 A1    Mar. 26, 2015

(30) Foreign Application Priority Data

May 25, 2012    (JP) .................................. 2012-120180

(51) Int. Cl.
*G06F 9/44* (2006.01)
*G06F 9/48* (2006.01)
(Continued)

(52) U.S. Cl.
CPC ............ *G06F 9/4843* (2013.01); *G06F 9/445* (2013.01); *H04L 67/12* (2013.01); *G06F 9/4443* (2013.01)

(58) Field of Classification Search
CPC ...... G06F 9/445; G06F 9/4843; G06F 9/4443; H04L 67/12; H04L 67/1002; H04L 69/329
See application file for complete search history.

(56) References Cited

U.S. PATENT DOCUMENTS 6,226,665 B1    5/2001  Deo et al.
8,671,414 B1 *  3/2014  Loafman ................. G06F 9/544
                                                  718/106
(Continued)

FOREIGN PATENT DOCUMENTS

JP    2005-33295 A    2/2005
JP    4897884 B       3/2012
WO    2008/027615 A1  3/2008

OTHER PUBLICATIONS

International Search Report for PCT/JP2013/064472 dated Jul. 9, 2013 [PCT/ISA/210].

*Primary Examiner* — Lewis A Bullock, Jr.
*Assistant Examiner* — Tina Huynh
(74) *Attorney, Agent, or Firm* — Sughrue Mion, PLLC

(57) ABSTRACT

A communication device communicating in conformance with a prescribed communication standard. The device includes a storage storing at least a first virtual program that includes a program implementing a first function of the communication device and a second virtual program that includes a program implementing a second function of the communication device. It also includes an executor configured to successively execute the first and second virtual programs, and a switching controller configured to read at least a part of either one of the first and second virtual programs from the storage, to store the part of either one of the first and second virtual programs into a memory of the executor, to execute the part of either one of the first and second virtual programs in the executor, thereby, to switch (Continued)

the first and second virtual programs to be executed in the executor.

9 Claims, 6 Drawing Sheets

(51) Int. Cl.
*H04L 29/08* (2006.01)
*G06F 9/445* (2006.01)

(56) References Cited

U.S. PATENT DOCUMENTS

| | | | |
|---|---|---|---|
| 2007/0270212 A1 | 11/2007 | Cockerille et al. | |
| 2008/0178290 A1* | 7/2008 | Besch | G06F 21/53 726/22 |
| 2008/0229316 A1* | 9/2008 | Akima | G06T 5/20 718/103 |
| 2009/0198809 A1* | 8/2009 | Goto | G06F 9/45558 709/223 |
| 2011/0070873 A1* | 3/2011 | Balasaygun | H04M 1/2477 455/418 |
| 2012/0117566 A1* | 5/2012 | Maeda | G06F 21/53 718/1 |
| 2012/0221807 A1* | 8/2012 | Wade | G06F 9/45558 711/154 |
| 2012/0324442 A1* | 12/2012 | Barde | H04L 49/70 718/1 |
| 2013/0007199 A1* | 1/2013 | Malhotra | H04L 69/08 709/217 |
| 2013/0097603 A1* | 4/2013 | Amano | G06F 9/4843 718/1 |

\* cited by examiner

COMMUNICATION DEVICE

TECHNICAL FIELD

The present invention relates to a communication device.

The present application claims priority based on Japanese patent application 2012-120180, filed on May 25, 2012 and includes herein by reference the content thereof.

BACKGROUND ART

Conventionally, in order to achieve a high level of automated operation in a plant, a factory, or the like, a distributed control system (DSC) has been implemented, in which on-site devices such as measuring instruments and actuators, which are referred to as field devices are connected via a communication means to controllers that controls the field devices. Although the communication system that forms the base of such a distributed control system had been almost always one that communicates by cable, recent years have seen the appearance of ones that communicate wirelessly, in conformance with an industrial communication standard such as ISA100.11a or WirelessHART (registered trademark).

The above-noted ISA100 is a wireless communication standard used in measurement, control, or the like in a plant or the like and was established by the ISA (International Society of Automation). In contrast, the above-noted WirelessHART is a wireless communication standard put forward by the HART (Highway Addressable Remote Transducer) Communication Foundation in the US as the base of a sensor network (a wireless network enabling collection of environmental or physical conditions by wireless terminals having a plurality of sensors spatially distributed and acting in concert).

In Patent Reference 1 noted below, art is disclosed that mutually connects a wireless sensor network conforming to ZigBee (registered trademark), which is a wireless standard for near-field and low-power consumption communication, and an IP network, which is a network of computers mutually connected using the IP (Internet Protocol). Specifically, in Patent Reference 1 noted below, by providing a gateway having a protocol stack implementing communication via a wireless sensor network conforming to ZigBee and a protocol stack implementing communication via the IP network, these networks are mutually connected.

PRIOR ART REFERENCE

Patent Reference

Patent Reference 1 Japanese Patent No. 4897884

SUMMARY OF THE INVENTION

Problem to be Solved by the Invention

A computer connected to the above-described IP network often has a CPU (central processing unit) having a high processing capability and a large-capacity memory or the like. Such a computer has a plurality of application programs and a plurality of programs implementing communication protocols embedded therein and can, in addition to running a plurality of applications in parallel, switch the communication protocol used for each application.

In contrast, because the above-described field device or a device used in the above-described sensor network is required to operate energy-efficiently, it is often configured with the minimum required hardware. Specifically, the configuration often adopted is one of a CPU having a processing capacity enabling execution of a specific application and communication by a specific communication protocol and a memory having a capacity enabling execution of programs implementing the application and the communication protocol.

The above-described application program, even if the application program is used for a computer connected to the above-described IP network or a device required to run with energy efficiency as described above, might be upgraded for the purpose of adding new functionality or for the purpose of enhancing existing functionality. Because a computer connected to the IP network has a large-capacity memory, there is almost never a problem, even if the size of the application program increases by an upgrading or the like. However, because a device required to operate energy-efficiently as described above often has a minimum hardware configuration, when the size of an application program increases by upgrading or the like, it might become impossible to execute the application program because of insufficient memory.

Also, there are often restrictions on the expandability of the hardware of field devices and devices connected to a sensor network. For example, although expansion is easy using an external interface to a low-speed memory such as flash memory, rarely is there an external bus enabling connection to high-speed memory enabling storage of programs, run-time parameters, or the like. For this reason, it is not easy to connect a high-speed memory to accommodate the above-noted increase in program size and expand the capacity that can execute a program.

One aspect of the present invention provides a communication device capable of avoiding a situation in which application program execution becomes impossible, even if the program size increases.

Means for Solving the Problem

In a communication device communicating in conformance with a prescribed communication standard, the communication device of one aspect of the present invention includes at least a storage storing at least a first virtual program that includes a program implementing a first function of the communication device and a second virtual program that includes a program implementing a second function of the communication device, an executer configured to successively execute the first and second virtual programs, and a switching controller configured to read at least a part of either one of the first and second virtual programs from the storage, to store the part of either one of the first and second virtual programs into a memory of the executer, to execute the part of either one of the first and second virtual programs in the executer, after completion of the processing of the one virtual program, to delete at least a part of the one virtual program from the memory in accordance with free area in the memory, to read at least a part of the other virtual program of the first and second virtual programs from the storage, to store the part of the other virtual program into the memory of the executer, and to execute the part of the other virtual program in the executer, thereby, to switch the first and second virtual programs to be executed in the executer.

According to the communication device of one aspect of the present invention, the executer includes an information holding area storing information passed between the first and second virtual programs.

According to the communication device of one aspect of the present invention, the first virtual program includes a program that transmits and receives data via a protocol stack established by the prescribed communication standard, and the second virtual program includes a program that implements at least pre-processing or post-processing of data.

According to the communication device of one aspect of the present invention, when data is transmitted to the communication device from outside, the switching controller is configured to execute the first virtual program in the executer, to cause the first virtual program to perform the receiving processing of data, after completion of the receiving processing by the first virtual program, to switch the virtual program to be executed in the executer from the first virtual program to the second virtual program, to cause the second virtual program to perform post-processing of data subjected to the receiving processing.

According to the communication device of one aspect of the present invention, the first virtual program uses parameters to be used in the receiving processing, and the second virtual program uses parameters to be used in the post-processing processing.

According to the communication device of one aspect of the present invention, when data is transmitted to outside of the communication device, the switching controller is configured to execute the second virtual program in the executer, to cause the second virtual program to perform pre-processing of data, after completion of the pre-processing of the second virtual program, to switch the virtual program to be executed in the executer from the second virtual program to the first virtual program, and to cause the first virtual program to perform transmission processing of data subjected to the pre-processing.

According to the communication device of one aspect of the present invention, the first virtual program uses parameters to be used in the transmitting processing, and the second virtual program uses parameters to be used in the pre-processing.

According to the communication device of one aspect of the present invention, the first virtual program includes a program to be used during usual operation pre-configured based on the frequency of execution, and the second virtual program includes a program to be used during a non-usual operation pre-configured based on the frequency of execution.

According to the communication device of one aspect of the present invention, completion of processing of the one virtual program, if it is verified that there is no free area to store at least the part of the other virtual program into the memory of the executer, the switching controller is configured to delete at least a part of the one virtual program from the memory.

According to the communication device of one aspect of the present invention, after completion of processing of the one virtual program, if it is verified that there is free area to store at least the part of the other virtual program into the memory of the executer, the switching controller is configured to store at least the part of the other virtual program into the memory of the executer without deleting the one virtual program from the memory.

A program execution control method of one aspect of the present invention is the method in a communication device communicating in conformance with a prescribed communication standard, the method includes a step of storing into a memory of an executer of the communication device at least a part of either one of a first virtual program that includes a program implementing a first function of the communication device and a second virtual program that includes a program implementing a second function of the communication device, and executing the one virtual program in the executer, a step, after completion of execution of the one virtual program, of deleting at least a part of the one virtual program from the memory in accordance with free area in the memory, and a step, after deleting of at least a part of the one virtual program from the memory of the executer in accordance with free area in the memory, of storing at least a part of the other virtual program of the first and second virtual programs into the memory of the executer and executing the other virtual program in the executer.

According to the program execution control method of one aspect of the present invention, the first virtual program includes a program that transmits and receives data via a protocol stack established by the prescribed communication standard, and the second virtual program includes a program that implements at least pre-processing or post-processing of data.

According to the program execution control method of one aspect of the present invention, the first virtual program includes a program to be used during usual operation pre-configured based on the frequency of execution, and the second virtual program includes a program to be used during a non-usual operation pre-configured based on the frequency of execution.

According to the program execution control method of one aspect of the present invention, the step of deleting at least the part of the one virtual program from the memory in accordance with free area in the memory includes a step of deleting at least the part of the one virtual program from the memory if there is no free area to store at least the part of the other virtual program into the memory of the executer.

According to the program execution control method of one aspect of the present invention, the step of deleting at least the part of the one virtual program from the memory in accordance with free area in the memory includes a step of, without deleting the one virtual program from the memory, storing at least the part of the other virtual program into the memory of the executer if there is free area to store at least the part of the other virtual program into the memory of the executer.

Effect of the Invention

Because one aspect of the present invention executes, in an executer under the control of a switching controller, one of a first virtual program including a communication program that implements a protocol stack and a part of an application program (a program that transmits and receives data via the protocol stack) and a second virtual program including the remainder of the application program, it achieves the effect of avoiding a situation in which execution of an application program becomes impossible, even if the program size increases. It is also possible to easily accommodate this by expanding the storage when the size of the virtual program increases.

DESCRIPTION OF EMBODIMENTS

A communication device according to an embodiment of the present invention will be described in detail below, with references made to the drawings.

First Embodiment

Figure 1:
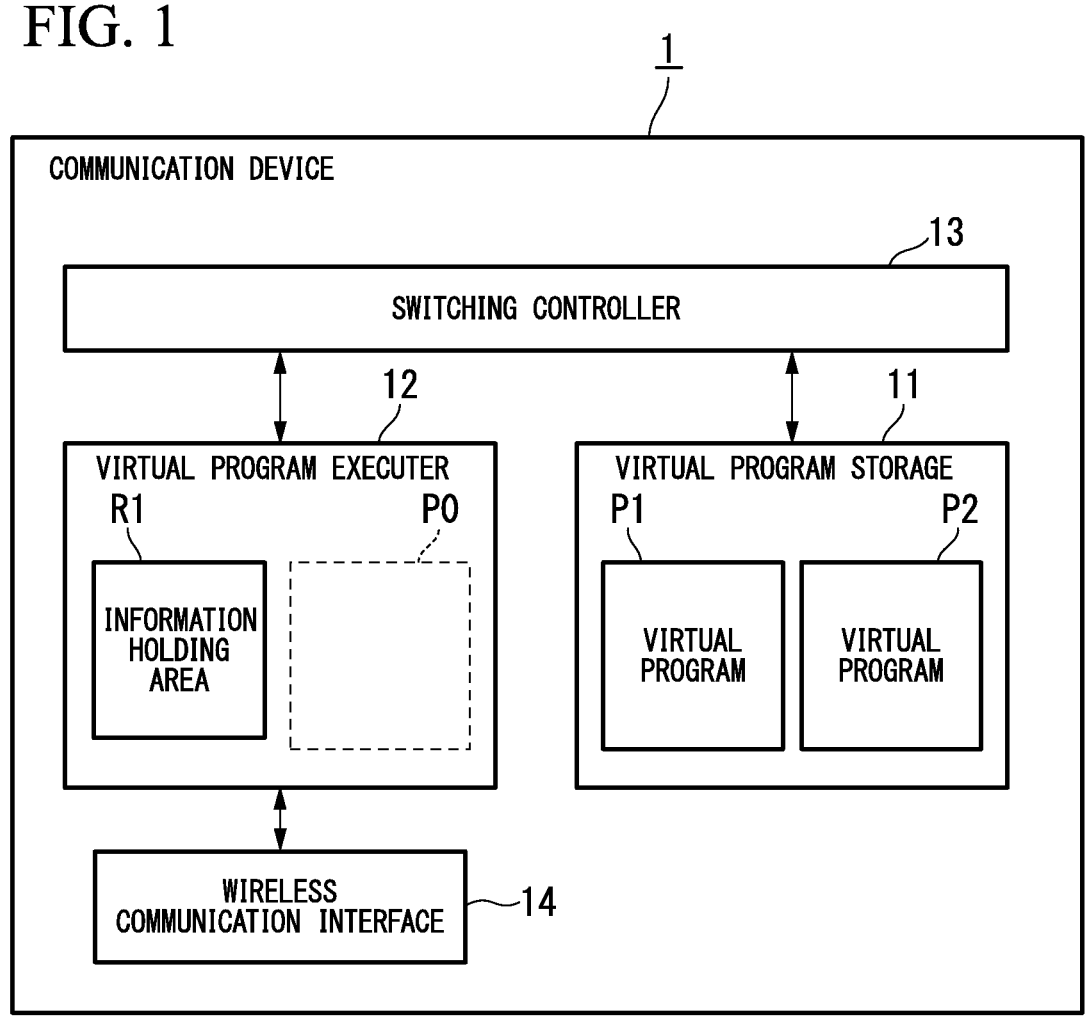
FIG. 1 is block diagram showing the main parts of the constitution of a communication device according to a first embodiment of the present invention.

FIG. 1 is a block diagram showing the main parts of the constitution of a communication device according to the first embodiment of the present invention. As shown in FIG. 1, a communication device 1 of the first embodiment has a virtual program storage 11 (storage), a virtual program executer 12 (executer), a switching controller 13, and a wireless communication interface 14, and communicates in conformance with a prescribed wireless communication standard. For example, the communication device 1 is a field device communicating wirelessly in conformance with ISA100, which is an industrial wireless communication standard.

The virtual program storage 11 is implemented by a non-volatile memory such as a flash ROM (read-only memory) or an EEPROM (electrically erasable and programmable ROM), and stores a virtual program P1 (first virtual program) and a virtual program P2 (second virtual program) used in the communication device 1. The virtual programs P1 and P2 include a plurality of programs or divided programs, in accordance with the hardware configuration of the communication device 1.

Figure 2:
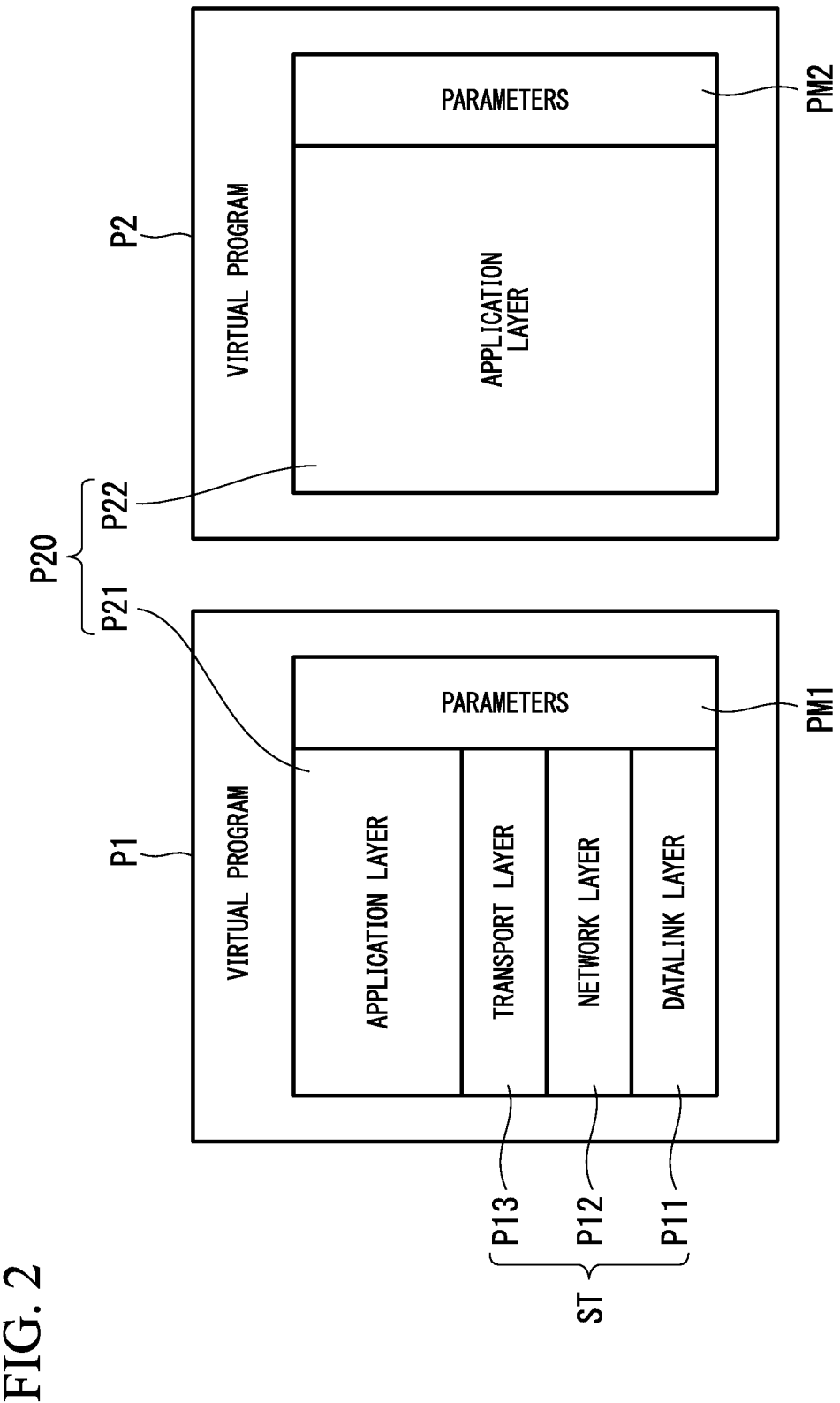
FIG. 2 is a drawing showing an example of a virtual program in the first embodiment of the present invention.

FIG. 2 is a drawing showing an example of a virtual program in the first embodiment of the present invention. As shown in FIG. 2, the virtual program P1 includes communication programs P11 to P13 and an application program P21, and uses parameters PM1. The communication programs P11 to P13 implement a protocol stack ST conforming to an above-noted wireless communication standard. Specifically, the communication program P11 implements a data-link layer of the protocol stack ST, the communication program P12 implements a network layer of the protocol stack ST, and the communication program P13 implements a transport layer of the protocol stack ST.

For example, the communication program P11 implements a data-link layer established by the IEEE 802.15.4 wireless communication standard. The communication program P12 implements a network layer established by IPv6, which is a type of Internet protocol. The communication program P13 implements a UDP (user datagram protocol) established by the Internet protocol as a transport layer.

The application program P21 of the application programs P20 that implements the functionality of the communication device 1 (for example, a flow rate measurement function, a temperature measurement function, and other functions) executes transmission and receiving of data via the protocol stack ST. The parameters PM1 are used when the communication programs P11 to P13 and the application program P21 are executed, these being, for example, information indicating the transmission destination and transmission source of data and information (subnet ID) for identifying a communication network.

In contrast, the virtual program P2 includes an application program P22 and uses parameters PM2. The application program P22 is the remainder of the application program P20, other than the application program P21. For example, the application program P22 implements the pre-processing of data to be transmitted via the protocol stack ST, post-processing of data received via the protocol stack ST, and the above-described functionality of the communication device 1 (for example, a flow rate measurement function, a temperature measurement function, and other functions). The pre-processing includes encryption processing, but may include other processing. The post-processing includes decryption processing, but may other processing. The parameters PM2 are used when the application program P22 is executed, these being, for example, key information used in encryption processing, information indicating an encryption algorithm, and information indicating the units of a measured flow rate or temperature.

In the first embodiment, although the application program P20 is described as being divided into the application program P21, which receives and transmits data via the protocol stack ST, and the application program P22, which is the remainder of the application program, the application program P20 may be divided in an arbitrary manner. For example, the application program P20 may be divided into three or more programs. However, neither a condition in which the application program P20 cannot be executed nor one in which the processing by the communication device 1 (for example, data receiving and transmission processing) is hindered may occur. Additionally, the application program P22 may be divided into a plurality of subprograms, with execution of the program being done in units of these subprograms. The application program P22 is divided in this manner so that, even if the size of the application program P22 grows to larger than can be executed by the communication device 1, the application program P22 can be executed.

The virtual program executer 12 successively executes the virtual programs P1 and P2, which had been stored in the virtual program storage 11. The virtual program executer 12 is implemented by a CPU (central processing unit) and a volatile memory such as a RAM (random-access memory) or the like, and executes a virtual program read from the virtual program storage 11 under the control of the switching controller 13 as it is stored in the volatile memory. The capacity of the volatile memory constituting a part of the virtual program executer 12 may be set to a capacity capable of executing the virtual programs P1 and P2. In FIG. 1, as an aid to understanding, the virtual program read into the virtual program executer 12 is expressed as being the virtual program P0 shown by the broken line.

The virtual program executer 12 has an information holding area R1 that holds information passed between the virtual programs executed by the virtual program executer 12. The information holding area R1 holds, for example, data that has been subjected to receiving processing by the virtual program P1 and data that has been subjected to encryption processing by the virtual program P2. Providing the information holding area R1 enables smooth passing of information between the virtual programs P1 and P2, which are switched by the switching controller 13.

Figure 3:
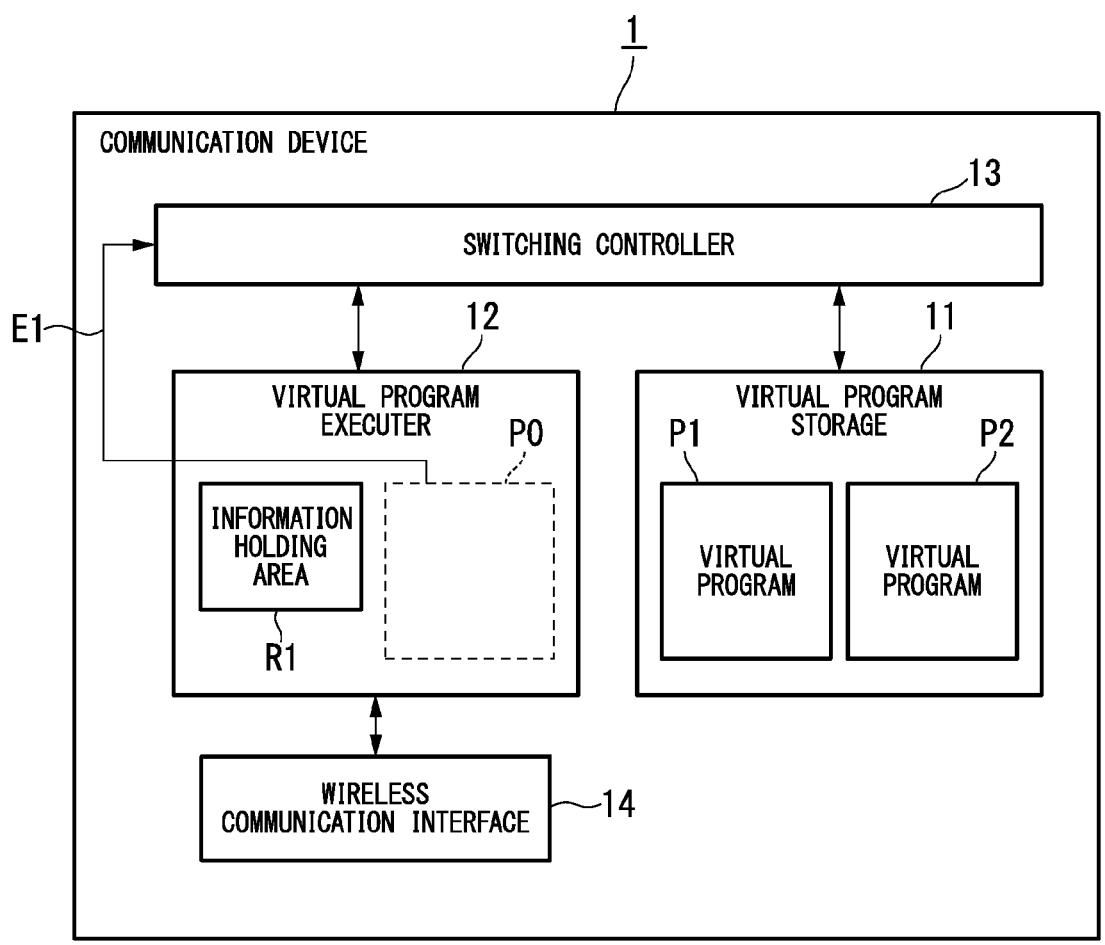
FIG. 3 is a drawing for describing the virtual program switching conditions in the first embodiment of the present invention.

The switching controller 13 switches the virtual programs P1 and P2 that are executed by the virtual program executer 12. Specifically, when the event signal E1 is output from the virtual program P0 executed by the virtual program executer 12, the switching controller 13, as shown in FIG. 3, switches the virtual programs P1 and P2 that are executed by the virtual program executer 12. FIG. 3 is a drawing for describing the conditions for switching the virtual programs in the first embodiment of the present invention.

For example, when data is transmitted from outside of the communication device 1, the switching controller 13 reads the virtual program P1 from the virtual program storage 11, stores it into the memory of the virtual program executer 12, and causes the virtual program executer 12 to execute the program. Then, when the event signal E1 indicating that receiving processing has been completed is output from the virtual program P1 (virtual program P0), the switching controller 13 verifies that there is enough free area in the memory of the virtual program executer 12 to store the virtual program P2 and, if there is free area, without deleting the virtual program P1, reads the virtual program P2 from the virtual program storage 11 and stores the program into the memory of the virtual program executer 12. If, however, there is no free area in the memory of the virtual program executer 12 to store the virtual program P2, the virtual program P1 is deleted from the memory of the virtual program executer 12 and the virtual program P2 is read from the virtual program storage 11 and stored into the memory of the virtual program executer 12. If each of the virtual programs P1 and P2 includes a plurality of subprograms, a program that is one of these subprogram units may be read from the virtual program storage 11, be stored into the memory of the virtual program executer 12, and be deleted from the memory. This performs post-processing such as decryption processing with respect to data that has been subject to receiving processing by switching of the virtual program executed by the virtual program executer 12 from the virtual program P1 to the virtual program P2.

For example, when data is to be transmitted to outside of the communication device 1, the switching controller 13 reads the virtual program P2 from the virtual program storage 11, stores it in the memory of the virtual program executer 12, and makes the virtual program executer 12 execute the program to perform pre-processing such as encryption processing. Then, when the event signal E1 indicating that the encryption processing has been completed is output from the virtual program P2 (virtual program P0), the switching controller 13 verifies whether there is free area in the memory of the virtual program executer 12 to store the virtual program P1 and, if there is free area, without deleting the virtual program P2, it reads the virtual program P1 from the virtual program storage 11 and stores the program into the memory of the virtual program executer 12. If, however, if there is no free area to store the virtual program P1 in the memory of the virtual program executer 12, the virtual program P2 is deleted from the memory of the virtual program executer 12, and the virtual program P1 is read from the virtual program storage 11 and is stored into the memory of the virtual program executer 12. If each of the virtual programs P1 and P2 includes a plurality of subprograms, a program that is one of these subprogram units may be read from the virtual program storage 11, be stored into the memory of the virtual program executer 12, and be deleted from the memory. This switches the virtual program executed by the virtual program executer 12 from the virtual program P2 to the virtual program P1 and performs transmission processing of data that has been subjected to encryption processing.

Additionally, if the state of the virtual program P0 executed by the virtual program executer 12 has become indefinite (for example, if a watchdog timer detects a problem), the switching controller 13 always makes the virtual program executer 12 execute the virtual program P1, which includes the communication programs P11 to P13 implementing the protocol stack ST. This is done, for example, in order to perform a remote reset of a problem occurring during execution of the virtual program P2, so that the communication device 1 is placed in a state in which it can communicate. If remote resetting of a problem occurring in the communication device 1 is possible in this manner, the need for a worker to go to the installation location of the communication device 1 and perform a reset is eliminated, thereby enabling a quick resetting of the communication device 1.

The wireless communication interface 14 receives data transmitted as a wireless signal from outside of the communication device 1, and transmits data as a wireless signal to outside the communication device 1. The wireless communication interface 14 corresponds to a physical layer as established in, for example, the IEEE 802.15.4 wireless communication standard, the IEEE 802.2.11n wireless communication standard, or the IEEE 802.11a wireless communication standard.

Next, the operation of the communication device 1 having the above-noted constitution will be simply described. In the following, the operation of receiving data transmitted as a wireless signal from outside the communication device 1 (receiving operation) and the operation of transmitting data as a wireless signal to outside the communication device 1 (transmitting operation) will be described by examples. The communication device 1 will be assumed to perform intermittent operation by a pre-configured schedule, in order to reduce the power consumption. For this reason, the communication device 1 performs transmission operation at a pre-configured timing and performs receiving operation at a pre-configured timing differing from the timing of the transmission operation.

(Receiving Operation)

Figure 4:
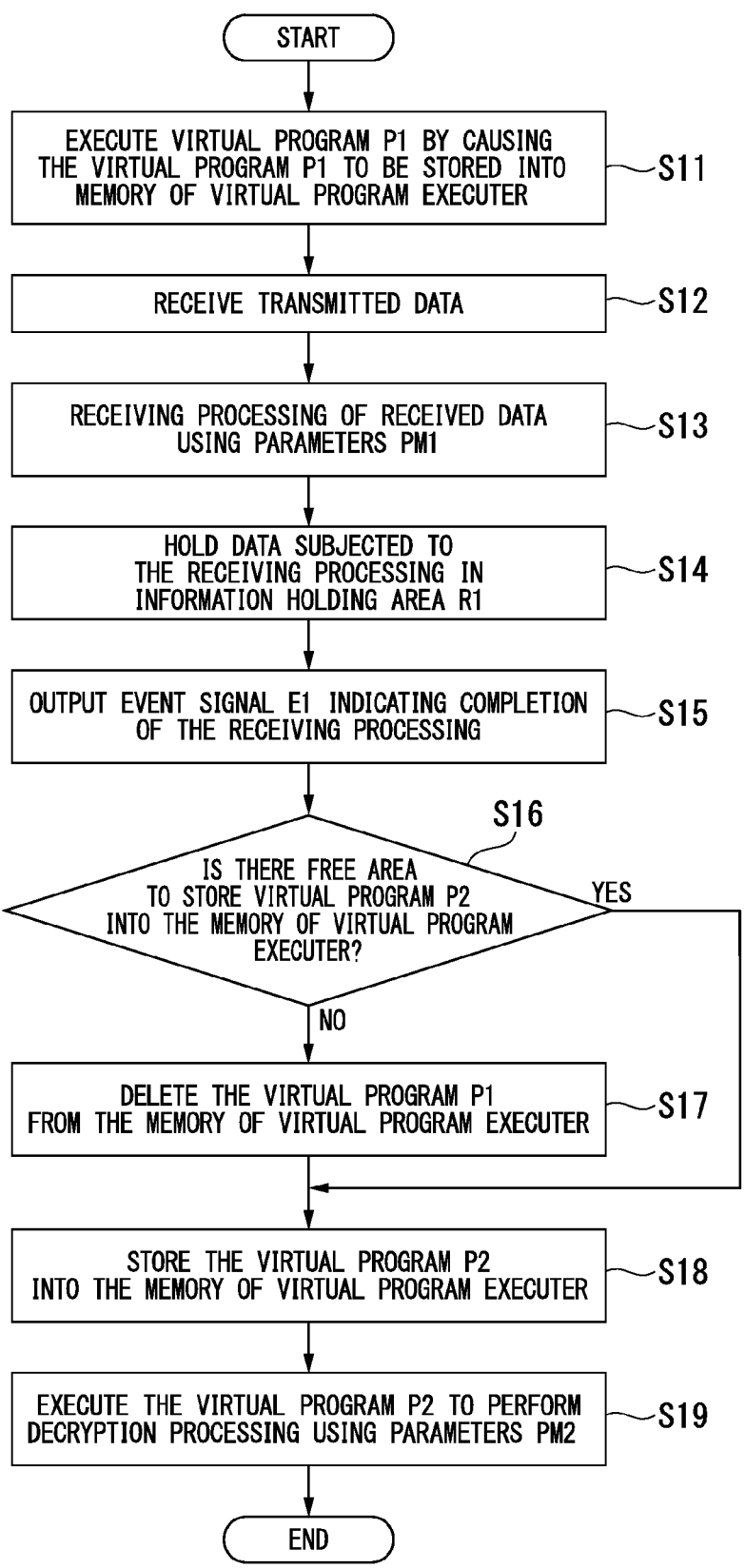
FIG. 4 is a flowchart showing receiving operation in a communication device according to the first embodiment of the present invention.

FIG. 4 is a flowchart showing the receiving processing in the communication device 1 according to the first embodiment of the present invention. When a receiving operation is going to be done, first the switching controller 13 reads the virtual program P1 stored in the virtual program storage 11, stores the program into the memory of the virtual program executer 12, and causes the virtual program executer 12 to execute the program (step S11). This implements, in the communication device 1, the protocol stack ST shown in FIG. 2 and the function of transmitting and receiving data via the protocol stack ST (functions by the application program P21).

With the virtual program P1 being executed, when data addressed to the communication device 1 is transmitted from outside the communication device 1, the wireless communication interface 14 receives the data (step S12). The data received by the wireless communication interface 14 is output to the virtual program executer 12, and the virtual program P1 executes receiving processing (packet processing or the like)(step S13). The receiving processing by the virtual program P1 is performed using the protocol stack ST implemented by the communication programs P11 to P13 and using the parameters PM1. Data that has been subjected to receiving processing is held in the information holding area R1 of the virtual program executer 12 (step S14).

When the receiving processing by the virtual program P1 ends, the event signal E1 indicating that the receiving processing has ended is output to the switching controller 13 from the virtual program P1 (virtual program P0) (step S15). Next, the switching controller 13 verifies whether there is free area in the memory of the virtual program executer 12 to store the virtual program P2 (step S16). If there is free area in the memory of the virtual program executer 12 to store the virtual program P2 (YES verification result at step S16), without deleting the virtual program P1 from memory, the virtual program P2 is read from the virtual program storage 11 and is stored into the memory of the virtual program executer 12 (step S18). If, however, there is no free area in the memory of the virtual program executer 12 to store the virtual program P2 (NO verification result at step S16), the virtual program P1 is deleted from the memory of the virtual program executer 12 (step S17), and the virtual program P2 is read from the virtual program storage 11 and is stored into the memory of the virtual program executer 12 (step S18). If each of the virtual programs P1 and P2 includes a plurality of subprograms, a program that is one of these subprogram units may be read from the virtual program storage 11, be stored into the memory of the virtual program executer 12, and be deleted from the memory. This switches the virtual program to be executed in the virtual program executer 12 from the virtual program P1 to the virtual program P2. This implements the functionality of the application program P22 as shown in FIG. 2 and performs post-processing such as decryption of data received via the protocol stack ST (step S19). In the decryption processing, data held in the information holding area R1 is read by the application program P22 and the parameters PM2 included in the virtual program P2 are used. In this manner, data is received that had been transmitted to the communication device 1.

The data obtained by the above-noted receiving processing is used, for example, in a function implemented by the application program P22 (for example, a flow rate measurement function, a temperature measurement function, and other functions). If a problem occurs in the processing of steps S17 to S19, in order to enable, for example, a remote reset of a problem occurring during the execution of the virtual program P2, the switching controller 13 switches the virtual program executed in the virtual program executer 12 from the virtual program P2 to the virtual program P1.

(Transmission Operation)

Figure 5:
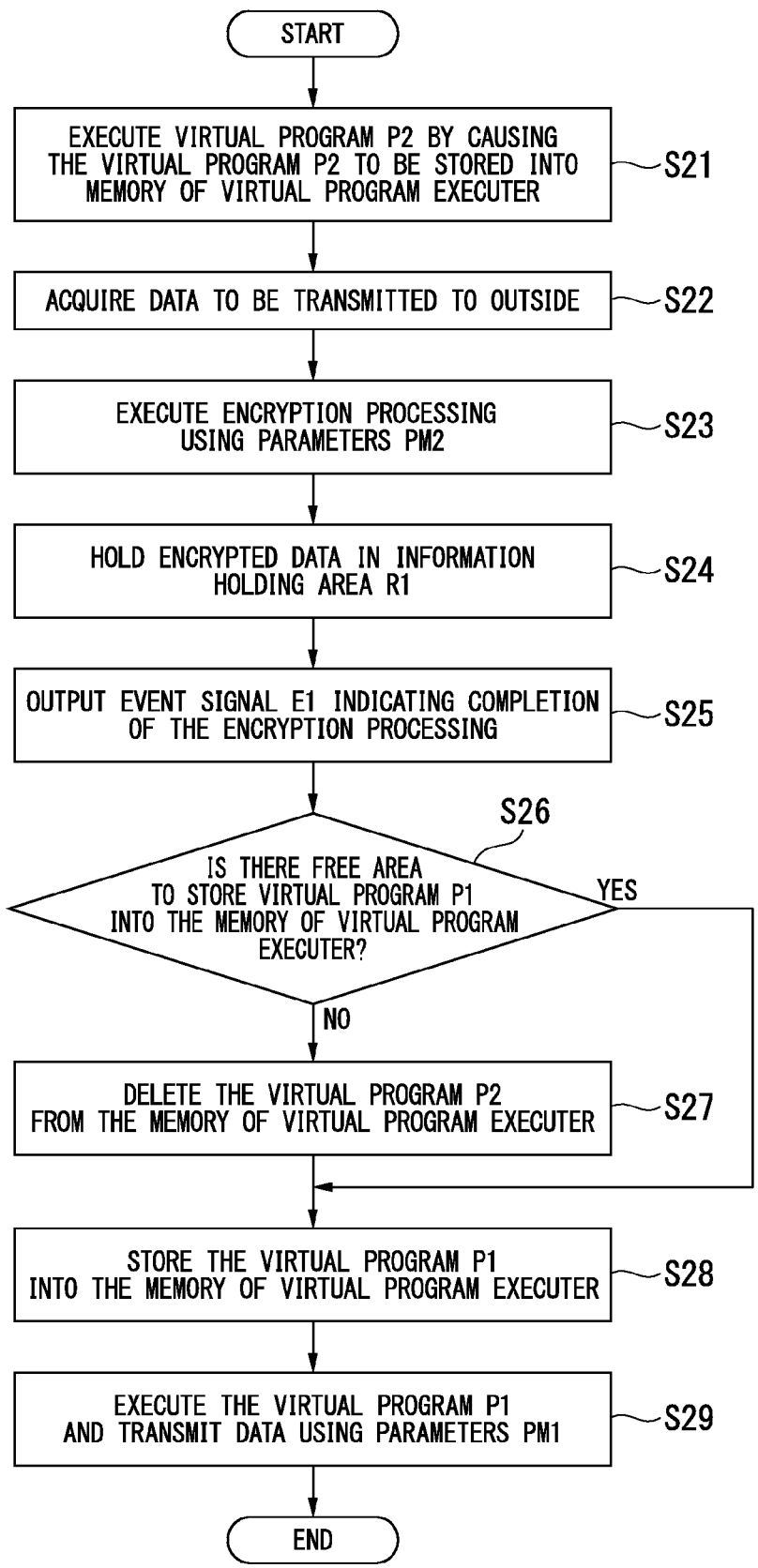
FIG. 5 is a flowchart showing transmitting operation in a communication device according to the first embodiment of the present invention.

FIG. 5 is a flowchart showing the transmission operation in the communication device 1 according to the first embodiment of the present invention. When a transmission operation is going to be done, first the switching controller 13 reads the virtual program P2 stored in the virtual program storage 11, stores the program into the memory of the virtual program executer 12, and the virtual program executer 12 executes the program (step S21). This implements the functionality of the application program P22 as shown in FIG. 2. When the virtual program P2 is executed, processing is performed to acquire data to be transmitted to outside the communication device 1 (step S22). For example, if the execution of application program P2 implements a flow rate measurement function in the communication device 1, processing to acquire measured flow rate data is performed, and if it implements a temperature measurement function in the communication device 1, processing to acquire measured temperature data is performed.

When data to be transmitted to outside the communication device 1 is acquired, the data is subjected to pre-processing such as encryption processing by the virtual program executer 12 (step S23). The encryption processing is performed using the parameters PM2 included in the virtual program P2. The encrypted data is held in the information holding area R1 of the virtual program executer 12 (step S24).

When the encryption processing by the virtual program P2 ends, the event signal E1 indicating that the encryption processing has ended is output to the switching controller 13 from the virtual program P2 (virtual program P0) (step S25). Next, the switching controller 13 verifies whether there is free area in the memory of the virtual program executer 12 to store the virtual program P1 (step S26). If there is free area in the memory of the virtual program executer 12 to store the virtual program P1 (YES verification result at step S26), without deleting the virtual program P2 from the memory, the virtual program P1 is read from the virtual program storage 11 and is stored into the memory of the virtual program executer 12 (step S28). If, however, there is no free area in the memory of the virtual program executer 12 to store the virtual program P1 (NO verification result at step S26), the virtual program P2 is deleted from the memory of the virtual program executer 12 (step S27), and the virtual program P1 is read from the virtual program storage 11 and is stored into the memory of the virtual program executer 12 (step S28). If each of the virtual programs P1 and P2 includes a plurality of subprograms, a program that is one of these subprogram units may be read from the virtual program storage 11, be stored into the memory of the virtual program executer 12, and be deleted from the memory. This switches the virtual program to be executed in the virtual program executer 12 from the virtual program P2 to the virtual program P1. This implements the protocol stack ST and the function of receiving and transmitting data via the protocol stack ST (the functionality of the application program P21) as shown in FIG. 2.

The data encrypted by the virtual program P2 is subjected to transmission processing (packet processing or the like) by the virtual program P1 in the virtual program executer 12 (step S29). The transmission processing by the virtual program P1 is performed using the protocol stack ST implemented by the communication programs P11 to P13 and using the parameters PM1. After transmission processing of the data by the virtual program P1 ends, the data is output to the wireless communication interface 14 from the virtual program executer 12 and is transmitted as a wireless signal. In this manner, data is transmitted to the outside from the communication device 1.

If a problem occurs in the processing in of steps S21 to S27, the switching controller 13 switches the virtual program executed by the virtual program executer 12 from the virtual program P2 to the virtual program P1. This, similar to the case of the receiving processing, enables, for example, remote resetting of a problem occurring during execution of the virtual program P2.

As described above, in the first embodiment, the virtual programs P1 and P2 including a plurality of programs or divided programs, in accordance with the hardware configuration of the communication device 1 are stored in the virtual program storage 11, and the switching controller 13 switches the virtual programs P1 and P2 that are to be executed by the virtual program executer 12. For this reason, even if the size of the application program P20 implementing the functionality of the communication device 1 increases somewhat, a situation in which the execution of the application program P20 is impossible can be avoided.

Second Embodiment

Next, a communication device according to the second embodiment of the present invention will be described. The communication device of the second embodiment, similar to the communication device 1 according to the first embodiment, has a constitution having the virtual program storage 11 to the wireless interface 14. However, in the communication device of the second embodiment, the virtual programs P1 and P2 stored in the virtual program storage 11 are different than those in the first embodiment.

Specifically, in the first embodiment described above, the application program P20 included in the virtual programs P1 and P2 is divided, on the basis of having or not having a function to transmit and receive data, into the application program P21 that transmits and receives data and the remainder, which is the application program P22. In contrast, in the second embodiment, the application program P20 included in the virtual programs P1 and P2 is divided, based on the frequency of execution, into the application program P21 used during usual operation and the application program P22 used during non-usual operation (executed when required).

The application program P21 used in the usual operation includes, of the application program P20, a program transmitting and receiving of data via the protocol stack ST and a program implementing a flow rate measurement function, a temperature measurement function, or the like. In contrast, the application program P22 used in non-usual operation is, of the application program P20, a program of processing for maintenance or for key exchange by public key encryption.

That is, referring to FIG. 2, in the second embodiment, the virtual program P1 includes the communication programs P11 to P13 that implement the protocol stack ST and the application program P21 used during the above usual operation, and uses the parameters PM1. The parameters PM1 include information such as a transmission destination and source for communicating, and a subnet ID, and information indicating the units for measured flow rate or temperature. In contrast, the virtual program P2 includes the application program P22 used during the above non-usual operation, and uses the parameters PM2. The parameters PM2 include the main information during non-usual operation (for example, a secret key of an authenticator or a public key of a certification authority (CA)).

The switching controller 13 in the second embodiment switches the virtual programs P21 and P22 by an external event by communication. Specifically, at the time of launching, the switching controller 13 stores the virtual program P1 that performs usual operation into the memory of the virtual program executer 12, and makes the virtual program executer 12 execute the program. After that, if a non-usual operation packet (for key exchange or maintenance) is received from outside and the event signal E1 is output from the virtual program P1 (virtual program P0), the switching controller 13 verifies whether there is free area in the memory of the virtual program executer 12 to store the virtual program P2 and, if there is free area, it reads the virtual program P2 from the virtual program storage 11 without deleting the virtual program P1 and stores it into the memory of the virtual program executer 12. If, however, there is no free area in the memory of the virtual program executer 12 to store the virtual program P2, the virtual program P1 is deleted from the memory of the virtual program executer 12, and the virtual program P2 is read from the virtual program storage 11 and is stored into the memory of the virtual program executer 12. If each of the virtual programs P1 and P2 include a plurality of subprograms, a program that is one of these subprogram units may be read from the virtual program storage 11, be stored into the memory of the virtual program executer 12, and be deleted from the memory. This switches the virtual program, which is to be executed in the virtual program executer 12, to the virtual program P2.

Figure 6:
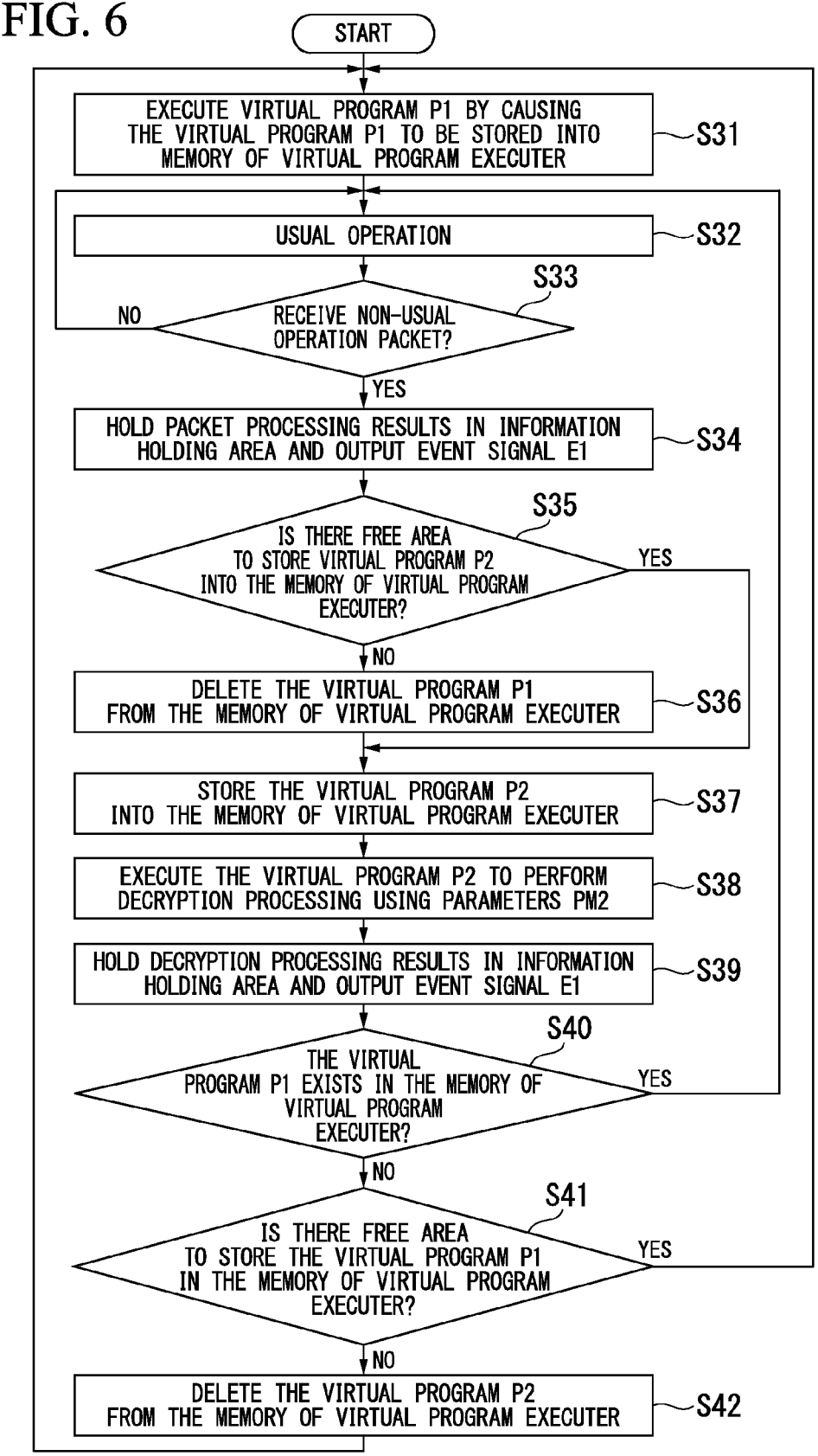
FIG. 6 is a flowchart showing the operation of a communication device according to a second embodiment of the present invention.

Next, the operation of the communication device 1 according to the second embodiment will be simply described. FIG. 6 is a flowchart showing the operation of a communication device according to the second embodiment. The flowchart shown in FIG. 6 starts by the powering on and startup of the communication device.

(Usual Operation)

When the communication device 1 starts up, first the switching controller 13 reads the virtual program P1 stored in the virtual program storage 11, stores it into the memory of the virtual program executer 12, and the program is executed in the virtual program executer 12 (step S31). This implements the protocol stack ST shown in FIG. 2 and the program implementing such functions as transmitting and receiving of data via the protocol stack ST and flow rate measurement (functions by the application program P21) in the communication device and performs usual operation (step S32). During usual operation, data is transmitted and received via the wireless communication interface 14.

During usual operation, the virtual program executer 12 judges whether or not a non-usual operation packet has been received in accordance with the virtual program P1 (virtual program P0) (step S33). Specifically, a judgment is made as to whether or not a packet for key exchange or maintenance has been received via the wireless communication interface 14. If the virtual program executer 12 judges that a non-usual operation packet has not been received (NO judgment result), usual operation is repeated (step S32).

In contrast, if the judgment is made that a non-usual operation packet has been received (YES judgment result at step S33), the virtual program P1 (virtual program P0) processes the packet in the protocol stack ST. Next, the virtual program P1 (virtual program P0) holds the results of processing (for example, key exchange information) in the information holding area R1 and outputs the event signal E1 to the switching controller 13 (step S34).

(Non-Usual Operation)

When the event signal E1 is input from the virtual program P1 (virtual program P0), the switching controller 13 verifies whether there is free area in the memory of the virtual program executer 12 to store the virtual program P2 (step S35). If there is free area in the memory of the virtual program executer 12 to store the virtual program P2 (YES verification result at step S35), without deleting the virtual program P1 from the memory, the virtual program P2 is read from the virtual program storage 11 and is stored into the memory of the virtual program executer 12 (step S37). If, however, there is no free area in the memory of the virtual program executer 12 to store the virtual program P2 (NO verification result at step S35), the virtual program P1 is deleted from the memory of the virtual program executer 12 (step S36), and the virtual program P2 is read from the virtual program storage 11 and stored into the memory of the virtual program executer 12 (step S37). If each of the virtual programs P1 and P2 includes a plurality of subprograms, a program that is one of these subprogram units may be read from the virtual program storage 11, be stored into the memory of the virtual program executer 12, and be deleted from the memory. This switches the virtual program, which is to be executed in the virtual program executer 12, from the virtual program P1 to the virtual program P2. This implements the functionality of the application program P22 shown in FIG. 2 in the communication device, and non-usual operation is done. Specifically, the virtual program P2 (virtual program P0) reads key exchange information held in the information holding area R1 and decryption processing using the secret key included in the parameters PM2 is done (step S38).

When the decryption processing ends, in addition to the processing results being held in the information holding area R1, the event signal E1 is output to the switching controller 13 from the virtual program P2 (virtual program P0) (step S39). When the event signal E1 from the virtual program P2 (virtual program P0) is input, the switching controller 13 verifies whether the virtual program P1 exists in the memory of the virtual program executer 12 (step S40). If the virtual program P1 exists in the memory of the virtual program executer 12 (YES verification result at step S40), the virtual program executed in the virtual program executer 12 is switched from the virtual program P2 to the virtual program P1. If the virtual program P1 does not exist in the memory of the virtual program executer 12 (NO verification result at step S40), verification is done as to whether or not free area exists in the memory of the virtual program executer 12 to store the virtual program P1 (step S41). If there is free area in the memory of the virtual program executer 12 (YES verification result at step S41), without deleting the virtual program P2, the virtual program P1 is read from the virtual program storage 11 and is stored into the memory of the virtual program executer 12 (step S31). If, however, there is no free area in the memory of the virtual program executer 12 to store the virtual program P1 (NO verification result at step S41), the virtual program P2 is deleted from the memory of the virtual program executer 12 (step S42), the virtual program P1 is read from the virtual program storage 11 and is stored into the memory of the virtual program executer 12 (step S31). If each of the virtual programs P1 and P2 includes a plurality of subprograms, a program that is one of these subprogram units may be read from the virtual program storage 11, be stored into the memory of the virtual program executer 12, and be deleted from the memory. This switches the virtual program to be executed in the virtual program executer 12 from the virtual program P2 to the virtual program P1, and usual operation again is done (step S32).

When usual operation is once again done, the virtual program P1 (virtual program P0) reads the results of the decryption processing stored in the information holding area R1 and uses the key obtained thereby to perform usual operation. If a problem occurs in the processing of steps S36 to S42, the switching controller 13 switches the virtual program executed in the virtual program executer 12 from the virtual program P2 to the virtual program P1. This, similar to the first embodiment, is to enable remote resetting of, for example, a problem occurring during the execution of the virtual program P2.

As described above, in the second embodiment, the application program P20 is divided into the application programs P21 and P22, based on the frequency of execution, in accordance with the hardware configuration of the communication device 1, these being included in the virtual programs P1 and P2, respectively, and the switching controller 13 switching the virtual programs P1 and P2. By doing this, even if the size of programs (for example a program performing key exchange processing for public key encryption), which, as seen from a device required to operate energy efficiently, are tending to grow in size, increases somewhat, a situation in which the execution of application program 20 is impossible can be avoided.

Although the foregoing has been a description of a communication device according to an embodiment of the present invention, the present invention is not restricted by the foregoing embodiments and may be freely modified within the scope thereof. For example, although in the above-described embodiments, the communication device 1 is described by giving the example for the case of a field device communicating wirelessly in conformance with ISA100, this may be a field device communicating wirelessly in conformance with WirelessHART (registered trademark). Also, the present invention is applicable not only to a communication device that communicates wirelessly, but also to a communication device that communicates by cable.

REFERENCE NUMERALS

1 Communication device
11 Virtual program storage
12 Virtual program executer
13 Switching controller
P1, P2 Virtual program
P11 to P13 Communication program
P20 Application program
P21, P22 Application program
PM1, PM2 Parameters
R1 Information holding area
ST Protocol stack

The invention claimed is:
1. A communication device communicating in conformance with a prescribed communication standard, the communication device comprising:
  a first virtual program that includes a protocol stack defined by the prescribed communication standard and configured to be executed via the protocol stack;
  wherein the first virtual program further comprises
    (1) only a program configured to execute a function of receiving data from outside or a function of sending the data to the outside which is a first function of the communication device, and does not comprise a program configured to execute a function of processing the data after receiving the data from the outside or a function of processing the data before transmitting the data to the outside which is a second function of the communication device, and
    (2) a parameter that is used for transmitting and receiving the data;
  a second virtual program that does not include any protocol stack;
  wherein the second virtual program further comprises
    (1) only a program configured to execute the second function of the communication device not using any protocol stack which is a function of processing the data after receiving the data from outside or processing the data before transmitting the data to the outside and does not comprise a program configured to execute a function of receiving data from outside or a function of sending the data to the outside which is the first function of the communication device, and
    (2) a parameter that is used for processing the data;
  a storage storing configured to non-temporarily store the first virtual program and the second virtual program;

a volatile memory configured to temporarily store the first virtual program and the second virtual program non-temporarily stored in the storage when the first virtual program and the second virtual program are executed;

a circuitry configured:
- to read one of the first and second virtual programs from the storage;
- to store the one of the first and second virtual programs into the volatile memory;
- to execute the one of the first and second virtual programs;
- to verify free area of the volatile memory after completion of the execution of the one of the first and second virtual programs;
- to delete the one of the first and second virtual programs from the volatile memory when it is verified that there is no free area of the volatile memory to store another of the first and second virtual programs;
- to read the other of the first and second virtual programs from the storage;
- to store the other of the first and second virtual programs into the volatile memory; and
- to execute the other of the first and second virtual programs, thereby, to switch the first and second virtual programs to be executed and to successively execute the first and second virtual programs.

2. The communication device according to claim 1, further comprising an information holder storing information passed between the first and second virtual programs.

3. The communication device according to claim 1, wherein, when the data is transmitted to the communication device from outside, the circuitry is configured to execute the first virtual program, to cause the first virtual program to perform the receiving processing of the data, after completion of the performance of the receiving processing by the first virtual program, to switch from the first virtual program being executed to the second virtual program, to cause the second virtual program to perform post-processing of the data subjected to the receiving processing.

4. The communication device according to claim 1, wherein, when the data is transmitted to outside of the communication device, the circuitry is configured to execute the second virtual program, to cause the second virtual program to perform pre-processing of the data, after completion of the performance of the pre-processing of the second virtual program, to switch from the second virtual program being executed to the first virtual program, and to cause the first virtual program to perform transmission processing of the data subjected to the pre-processing.

5. The communication device according to claim 1, wherein the first virtual program comprises a program to be used during usual operation pre-configured based on a frequency of execution, and wherein the second virtual program comprises a program to be used during a non-usual operation pre-configured based on the frequency of execution.

6. The communication device according to claim 1, wherein, after completion of the execution of the one of the first and second virtual programs, if it is verified that there is free area to store the other of the first and second virtual programs into the memory, the circuitry is configured to store the other of the first and second virtual programs into the memory without deleting the one of the first and second virtual programs from the volatile memory.

7. A program execution control method in a communication device communicating in conformance with a prescribed communication standard, the method comprising:
- a step of storing non-temporarily into a storage of the communication device one of a first virtual program and a second virtual program;
- wherein the first virtual program includes a protocol stack defined by the prescribed communication standard and configured to be executed via the protocol stack; and
- wherein the first virtual program further comprises
  (1) only a program configured to execute a function of receiving data from outside or a function of sending the data to the outside which is a first function of the communication device and does not comprise a program configured to execute a function of processing the data after receiving the data from the outside or a function of processing the data before transmitting the data to the outside which is a second function of the communication device, and
  (2) a parameter that is used for transmitting and receiving the data;
- the second virtual program that does not include any protocol stack;
- wherein the second virtual program further comprises
  (1) only a program configured to execute the second function of the communication device not using any protocol stack which is a function of processing the data via the protocol stack after receiving the data from outside or processing the data before transmitting the data to the outside and does not comprise a program configured to execute a function of receiving data from outside or a function of sending the data to the outside, which is the first function of the communication device, and
  (2) a parameter that is used for processing the data;
- a step, after completion of execution of the one of the first and second virtual programs, of verifying a free area of the memory and of deleting the one of the first and second virtual programs from the volatile memory when it is verified that there is no free area of the volatile memory to store another of the first and second virtual programs; and
- a step, after deleting the one of the first and second virtual programs from the volatile memory of the executor in accordance with free area in the volatile memory, of storing the other of the first and second virtual programs into the volatile memory and executing the other of the first and second virtual programs.

8. The method according to claim 7, wherein the first virtual program comprises a program to be used during usual operation pre-configured based on a frequency of execution, and wherein the second virtual program comprises a program to be used during a non-usual operation pre-configured based on the frequency of execution.

9. The method according to claim 7, wherein the step of deleting the one of the first and second virtual programs from the memory in accordance with free area in the volatile memory comprises a step of, without deleting the one of the first and second virtual programs from the volatile memory, storing the other of the first and second virtual programs into the volatile memory of the executor if there is free area to store the other of the first and second virtual programs into the volatile memory.

* * * * *